United States Patent
Schlosser et al.

(10) Patent No.: US 12,024,298 B2
(45) Date of Patent: Jul. 2, 2024

(54) AIRCRAFT SEAT MASSAGE SYSTEM AND AIRCRAFT SEAT WITH A MASSAGE SYSTEM

(71) Applicant: Bühler Motor GmbH, Nuremberg (DE)

(72) Inventors: Stefan Schlosser, Forchheim (DE); Stefan Gröllich, Uhldingen-Mühlhofen (DE); Christof Welter, Uhldingen-Mühlhofen (DE)

(73) Assignee: Bühler Motor GmbH, Nuremberg (DE)

( * ) Notice: Subject to any disclaimer, the term of this patent is extended or adjusted under 35 U.S.C. 154(b) by 739 days.

(21) Appl. No.: 16/783,323

(22) Filed: Feb. 6, 2020

(65) Prior Publication Data

US 2020/0255151 A1     Aug. 13, 2020

(30) Foreign Application Priority Data

Feb. 7, 2019   (DE) ...................... 10 2019 201 591.3

(51) Int. Cl.
*A61H 9/00*   (2006.01)
*B64D 11/06*   (2006.01)

(52) U.S. Cl.
CPC ....... *B64D 11/0647* (2014.12); *A61H 9/0078* (2013.01); *B64D 11/064* (2014.12);
(Continued)

(58) Field of Classification Search
CPC .......... A61H 9/0078; A61H 2201/0149; A61H 2201/0207; A61H 2201/5071;
(Continued)

(56) References Cited

U.S. PATENT DOCUMENTS 2,863,494 A * 12/1958 Lautier ................ B64D 11/064
                                                    297/411.3
4,634,179 A *  1/1987 Hashimoto ............ A47C 7/467
                                                    297/284.6
(Continued)

FOREIGN PATENT DOCUMENTS

DE      35 41 537 A1    6/1986
DE      38 39 130 C1    4/1990
(Continued)

OTHER PUBLICATIONS

Machine translation written description and claims for WO2006041112A1 (Year: 2006).*
(Continued)

*Primary Examiner* — Michael R Reid
*Assistant Examiner* — Tyler A Raubenstraw
(74) *Attorney, Agent, or Firm* — WHDA, LLP

(57) ABSTRACT

An aircraft seat massage system, with a pump module for conveying a gaseous medium, a valve module to convey and/or release the gaseous medium to and from a number of fillable gas cushions and a type of aircraft seat massage system, that can be scaled as flexibly as possible for the various requirements from the economy class up to first class. The massage system has a modular design and can be operated independently of a seat actuation system, whereby the operation is as quiet as possible.

26 Claims, 2 Drawing Sheets

(52) U.S. Cl.
CPC ............... *A61H 2201/0107* (2013.01); *A61H 2201/0149* (2013.01); *A61H 2201/0207* (2013.01); *A61H 2201/501* (2013.01); *A61H 2201/5038* (2013.01); *A61H 2201/5071* (2013.01)

(58) Field of Classification Search
CPC ...... A61H 2201/0107; A61H 2201/501; A61H 2201/5038; B64D 11/0647; B64D 11/064
See application file for complete search history.

(56) References Cited

U.S. PATENT DOCUMENTS

| | | | |
|---|---|---|---|
| 4,655,505 A | | 4/1987 | Kashiwamura et al. |
| 5,523,664 A | * | 6/1996 | Ogasawara .............. B60N 2/66 318/590 |
| 5,615,928 A | * | 4/1997 | Penley ................... A47C 31/11 297/452.56 |
| 5,873,137 A | | 2/1999 | Yavets-Chen |
| 6,098,000 A | * | 8/2000 | Long ........................ A47C 4/54 307/10.6 |
| 9,943,174 B1 | * | 4/2018 | Jacobs ................. A61H 9/0078 |
| 10,315,770 B2 | * | 6/2019 | Udriste .................. G08C 17/02 |
| 2002/0113476 A1 | * | 8/2002 | Enno ................. B64D 11/0643 297/217.3 |
| 2005/0101892 A1 | * | 5/2005 | Dehli ..................... A61H 23/04 601/149 |
| 2010/0181813 A1 | * | 7/2010 | Kramer ................. B64D 11/06 297/217.3 |
| 2010/0244504 A1 | * | 9/2010 | Colja .................. A61H 9/0078 297/284.6 |
| 2010/0276973 A1 | * | 11/2010 | Zenk .................... B60N 2/0244 297/284.3 |
| 2011/0282495 A1 | * | 11/2011 | Fischer ................. H04L 67/104 709/204 |
| 2015/0251573 A1 | * | 9/2015 | Misch .................... B60N 2/914 297/452.41 |
| 2016/0001886 A1 | * | 1/2016 | Fullerton ............. B60N 2/7005 297/219.1 |
| 2016/0140307 A1 | * | 5/2016 | Brosnan ................. G06Q 10/10 600/509 |
| 2016/0229320 A1 | | 8/2016 | Lem et al. |
| 2016/0296413 A1 | * | 10/2016 | Norman ................. B60N 2/976 |
| 2016/0317382 A1 | * | 11/2016 | Ode ..................... A61H 9/0078 |
| 2017/0086588 A1 | * | 3/2017 | Patrick ..................... A47C 7/14 |
| 2017/0106982 A1 | * | 4/2017 | John .................. B64D 11/0647 |
| 2017/0360641 A1 | * | 12/2017 | Nakata ................... A61H 7/007 |
| 2018/0015853 A1 | * | 1/2018 | Lem ....................... B60N 2/976 |
| 2018/0038514 A1 | * | 2/2018 | Kuszneruk .......... F16K 99/0044 |
| 2018/0072199 A1 | * | 3/2018 | Strumolo ............... B60N 2/806 |
| 2018/0129447 A1 | * | 5/2018 | Kao ....................... G06F 3/0685 |
| 2018/0250190 A1 | * | 9/2018 | Masuda .................. G06F 3/011 |
| 2018/0333325 A1 | * | 11/2018 | Inoue ..................... B60N 2/976 |
| 2019/0038229 A1 | * | 2/2019 | Perraut ................ A61H 9/0078 |
| 2019/0092203 A1 | | 3/2019 | Bauer et al. |
| 2019/0143856 A1 | * | 5/2019 | O'Hara .................. B60N 2/976 601/148 |
| 2019/0307634 A1 | * | 10/2019 | Moritomo .............. A61H 23/04 |
| 2019/0308579 A1 | * | 10/2019 | Jouper .................. G01G 19/07 |
| 2019/0328608 A1 | * | 10/2019 | Le ........................ A61H 23/006 |
| 2020/0010197 A1 | * | 1/2020 | Otovic ................. B60N 2/5883 |
| 2020/0022867 A1 | * | 1/2020 | Inada ................. A61H 15/0078 |
| 2020/0070702 A1 | * | 3/2020 | Sankrithi ............... B60N 2/643 |
| 2020/0092308 A1 | * | 3/2020 | Vanguardia ......... H04W 12/121 |
| 2020/0094985 A1 | * | 3/2020 | Quatmann ........... G09G 3/2003 |
| 2020/0148366 A1 | * | 5/2020 | Fagan .................. B64D 11/064 |
| 2021/0039530 A1 | * | 2/2021 | Wilson ................. B60N 2/5685 |
| 2021/0114731 A1 | * | 4/2021 | Guthrie ............. B64D 11/0643 |

FOREIGN PATENT DOCUMENTS

| | | | | |
|---|---|---|---|---|
| DE | 43 31 663 C1 | | 3/1995 | |
| DE | 10 2006 004 071 A1 | | 8/2007 | |
| DE | 2016 201 678 A1 | | 8/2016 | |
| DE | 10 2015 213 442 A1 | | 1/2017 | |
| DE | 10 2017 121 050 A1 | | 3/2018 | |
| DE | 10 2017 205 135 A1 | | 9/2018 | |
| EP | 1 447 070 A1 | | 8/2004 | |
| GB | 2419286 A | * | 4/2006 | .......... A47C 27/082 |
| GB | 2495521 A | * | 4/2013 | .......... A61H 9/0078 |
| WO | 01/40012 A2 | | 6/2001 | |
| WO | WO-2006041112 A1 | * | 4/2006 | ........ A61H 15/0078 |
| WO | WO-2007085828 A1 | * | 8/2007 | .......... A61B 5/7475 |
| WO | WO-2009012760 A2 | * | 1/2009 | ............. A47C 7/022 |
| WO | WO-2014200854 A1 | * | 12/2014 | ........ B64D 11/0015 |
| WO | WO-2015200738 A1 | * | 12/2015 | ............... B60N 2/02 |
| WO | WO-2017084803 A1 | * | 5/2017 | .......... A47C 27/083 |
| WO | WO-2019156450 A1 | * | 8/2019 | ............. A61F 7/007 |
| WO | WO-2020073091 A1 | * | 4/2020 | ........... A61B 5/0004 |

OTHER PUBLICATIONS

Machine translation of written description and claims from espacenet for WO2019156450A1 (Year: 2019).*

Search Report dated Jan. 15, 2020, issued in counterpart German Patent Application No. 10 2019 201 591.3 (9 pages).

* cited by examiner

AIRCRAFT SEAT MASSAGE SYSTEM AND AIRCRAFT SEAT WITH A MASSAGE SYSTEM

CROSS-REFERENCE TO RELATED APPLICATIONS

The present patent application claims priority from, German Application No. DE 10 2019 201 591.3, filed Feb. 7, 2019, and which is incorporated herein by reference in entirety.

BACKGROUND OF THE INVENTION

(1) Field of the Invention

The invention concerns an Aircraft seat massage system, with a pump module for conveying a gaseous medium, a valve module to convey and/or release the gaseous medium to and from a number of fillable gas cushions.

(2) Description of Related Art Including Information Disclosed Under 37 CFR 1.97 and 1.98

The continuous demands on the comfort of aircraft seats and the airlines' desire for a unique selling proposition represent an increasing challenge for seat manufacturers and the suppliers of seat controlling systems. Furthermore, standardized aircraft seats are only suitable for 90 to 95% of the air passengers. The remaining users, due to their height and weight, represent very individual and demanding requirements on a comfortable aircraft seat.

During longer flights, especially long-haul flights, the lack of opportunities for movement can cause muscle tension, muscle hardening and circulatory problems for the air passengers. As a rule, first class seats offer a higher level of seating comfort, wherein the seats have a greater number of adjustment possibilities to adjust to the seating geometry and the hardness of the seats for the respective passenger. Aircraft seats with a massage function are also available. These are, however, tailor-made to the special requirements of first-class seats and integrated in the seat actuation system (SAS).

The purpose of the present invention is to provide a type of aircraft seat massage system, that can be scaled as flexibly as possible for the various requirements in all seating classes or seat comfort classes. The present invention has a modular design and can be operated independently of a seat actuation system, wherein the operation must be as quiet as possible.

BRIEF SUMMARY OF THE INVENTION

A pump module to convey a gaseous medium and a valve module to distribute the gaseous medium over a number of gas cushions are provided and are interconnected via a pump connection line to guide the gaseous medium and a control line. One of the two modules, the pump module or the valve module is provided as a system master and the respective other module as a slave. Preferably the valve module should be selected as the system master because the valve module has a more central position and function in the massage system. For individual controllability, every gas cushion is connected to the valve module by its own pneumatic line. The system master can transmit instructions to the slave via the control line, e.g., to adjust the speed of rotation of the pump to the respective function.

The aircraft seat massage system can, according to the invention, be operated completely independently of other systems or combined as a subsystem with a large number of other systems.

The number, the positioning and the size of the gas cushions are freely selectable and can be adapted to the requirements of the airline and, last but not least, to the passengers' expectations. The massage system includes at least two gas cushions, in particular twenty, or in particular forty gas cushions. These can be arranged in one or more rows or partially in single row and partially in multiple rows.

Especially in the case of a standalone solution, i.e. without integration in a seat actuation system, it may make sense to connect a switching unit and/or a PCU (Passenger Control Unit) directly to the system master without a bus connection.

In order that the aircraft seat massage system can easily be integrated into existing systems standard protocols for the internal communication between the modules can be used. As a result, the system master can also be controlled by a superordinate system. The aircraft seat massage system can, according to the invention, however, be operated completely independently from other systems. Frequently used bus protocols, such as CAN, LIN or RS485 can be used here. If a BLDC (brushless DC) motor is used, then a speed control line to a speed input on the motor can also be used. Optionally the pump motor can be equipped with a temperature sensor, this can be connected to the system master with its own line.

For the optional integration of the massage system in an existing seat actuation system, a bus connection to the system master (valve module or pump module) is available, to which a bus control line for the seat actuation system can be connected.

According to a particularly advantageous further development of the invention, it is planned to make the connection of pressure sensors to the massage system possible. The pressure sensors can be integrated into the seat on seating surface, the backrest and even in a leg support. Thereby it could be, for example, a matrix of Piezo sensors, which can detect the weight, the weight distribution and the height of the passenger.

The aircraft seat massage system can, after a further suggestion, also be extended by a heating function, as a result one or more gas cushions are equipped with heating element, heating mat or similar. The heating functions of each single gas cushion can therein be controlled and/or regulated. In a further development of these extra functions, the heating function of the gas cushion can be addressed depending on the massage program and/or dependent on the ambient temperature in the cabin or as a replacement for a conventional seat heating function.

The passenger can control the massage system via a human machine interface (HMI). Hereby the passenger can indirectly activate predefined settings for the massage system via a seat control, or select special massage programs from a menu. The user interface can be connected to the massage system via a cable or a wireless interface, e.g., a Bluetooth connection.

In order to ensure the quietest possible and most reliable operation of the massage system, the valves in the valve module are operated by shape memory elements.

To keep the wiring effort for the massage system as low as possible a daisy chain circuitry is planned.

With regard to a better ease of service, it is planned to equip the system master with integrated test equipment for the execution of self-tests BITE (Built-In-Test-Equipment). This also contains an electronic error memory in which system parameters, especially system errors or defect codes are stored during the flight. During a check, the data can easily be read via an interface.

Because the massage system is fully integrable, the error memory can also be located in an existing superordinate aircraft-data-module, e.g., in an in-flight entertainment module or in a passenger control unit (PCU). The flight crew can also be made aware of severe defects during the flight.

More highly developed aircraft seat systems have evaluation modules for passenger data. The aircraft seat massage system according to the invention can be operated independently and can, by using an evaluation module for passenger data, be preset individually to the passenger's requirements or load/activate programs individually tailor-made to the requirements of the respective passenger. Hereby approved patient data can also be used for this.

Expediently the filling level of the gas cushions should be controllable depending on the seat position, because, as a rule, not all the individual functions are suitable in all seat positions. Different massage programs are available for three seat positions, or the programs adapt to the respective seat position. Otherwise an aircraft seat with a massage system is also stressed, which at least corresponds to one of the designs mentioned or at least fulfills one of the functions mentioned.

BRIEF DESCRIPTION OF THE SEVERAL VIEWS OF THE DRAWINGS

An exemplary embodiment of the invention is explained in more detail below with reference to the drawing. The following is shown.

DETAILED DESCRIPTION OF THE INVENTION

Figure 1:
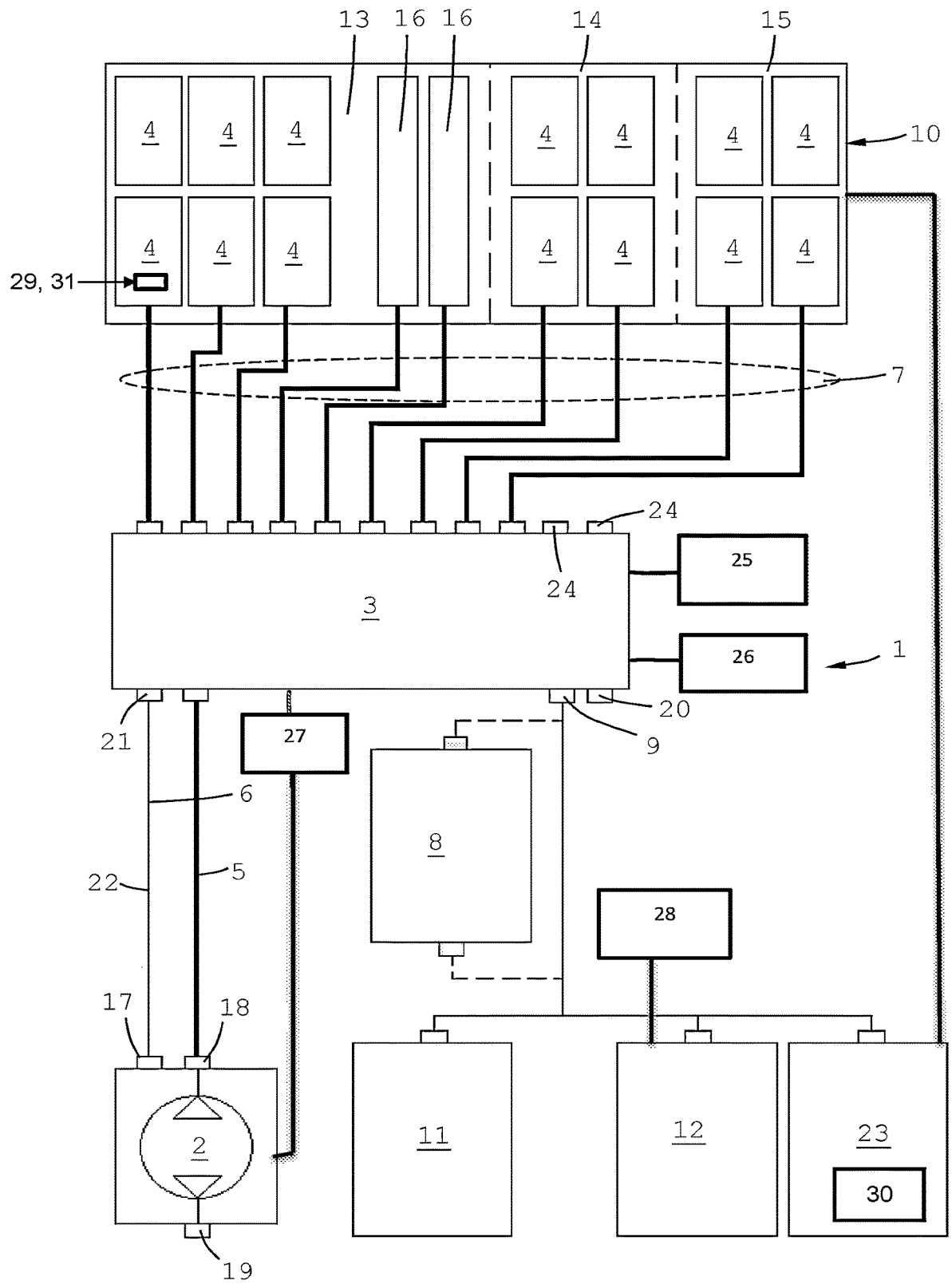
FIG. 1 is a circuit diagram of an aircraft seat massage system.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a circuit diagram of an aircraft seat massage system 1, with an implied aircraft seat 10, with a pump module 2, which mainly consists of a pneumatic pump, which has a pump control input 17, an air pipe connection 18 and an air outlet 19, a valve module 3, which is connected to a large number of gas cushions 4, via a pump connection line 5 with the pump module 2 and via gas cushion connection lines 7. On the valve module 3, additional connections 24 that are not in use are provided for connecting additional gas cushions. These additional connections 24 are possibly required for another application. The valve module 3 is fitted with an outlet connection 20 for an optional daisy chain circuitry (here an unused connection). The gas cushions 4 are divided into several groups, in particular on a backrest 13, part of the seat 14 and a leg support 15. The individual parts of the seat are separated from each other by a dashed line. Here two rows with gas cushions 4 are shown, wherein in the interest of simplification not all gas cushion connection lines 7 are shown. On the backrest 13 two additional gas cushions that serve as lumbar support 16 are shown, these cover a larger part of the seat width and have a significantly larger volume that the gas cushions 4 for the massage function. For the extension of the aircraft seat massage system 1 with additional functions, or for the integration into a seat actuation system the valve module 3 is fitted with a bus connection 9. Next to this, the pump module 2 is connected to a power and data interface 21 of the valve module 2 via a bus line 22.

In the example shown, the valve module 3 is used as a system master and the pump module 2 as a slave. The aircraft seat massage module functions completely independent of a seat actuation system 8, that is shown here as an option, but can easily be integrated.

A user interface 11 is provided to trigger or adjust the massage function. If a seat actuation system is integrated, then this can be operated via the same user interface 11.

In addition, data modules can be connected in order to collect, for example, measured values from the pressure sensors 23 or stored passenger data and to transmit this to the system master (here valve module 3).

Especially in the case of a standalone solution, i.e. without integration in a seat actuation system, it may make sense to connect a switching unit 25 and/or a PCU (Passenger Control Unit) 26 directly to the system master without a bus connection.

In order that the aircraft seat massage system can easily be integrated into existing systems standard protocols for the internal communication between the modules can be used. As a result, the system master can also be controlled by a superordinate system. The aircraft seat massage system can, according to the invention, however, be operated completely independently from other systems. Frequently used bus protocols, such as CAN, LIN or RS485 can be used here. For more economical systems, a complex bus architecture can be done without by connecting the pump module by means of a simple power supply line. The speed of rotation of the pump motor can be set by controlling or adjusting the voltage. If a BLDC (brushless DC) motor is used then a speed control line to a speed input on the motor can also be used. Optionally the pump motor can be equipped with a temperature sensor 27, this can be connected to the system master with its own line.

For the optional integration of the massage system in an existing seat actuation system, a bus connection 9 to the system master (valve module 3 or pump module 2) is available, to which a bus control line for the seat actuation system can be connected.

According to a particularly advantageous further development of the invention, it is planned to make the connection of pressure sensors 23 to the massage system possible. The pressure sensors can be integrated into the seat on seating surface, the backrest and even in a leg support. Thereby it could be, for example, a matrix of Piezo sensors 30, which can detect the weight, the weight distribution and the height of the passenger. In the simplest case the pressure sensors 23 could record the occupancy status of the aircraft seat. Finally, the cushion pressure can be determined by the pressure sensors 23. The measurement data can be transmitted to the valve module 3 via the data bus, which then, taking further information on the passenger into consideration, potentially controls the pump parameters and the valve settings.

The aircraft seat massage system can, after a further suggestion, also be extended by a heating function 29, as a result one or more gas cushions 4 are equipped with heating elements 31, heating mat or similar. The heating functions of each single gas cushion can therein be controlled and/or regulated.

In a further development of these extra functions, the heating function of the gas cushion 4 can be addressed depending on the massage program and/or dependent on the ambient temperature in the cabin or as a replacement for a conventional seat heating function.

The actuation of this heating function is possible via the seat actuation system 8 or via the system master 3.

The passenger can control the massage system via a human machine interface (HMI). Hereby the passenger can indirectly activate predefined settings for the massage system via a seat control, or select special massage programs from a menu. The user interface can be connected to the massage system via a cable or a wireless interface, e.g., a Bluetooth connection.

In order to ensure the quietest possible and most reliable operation of the massage system, the valves in the valve module 3 are operated by shape memory elements 32. The valves can be opened or closed individually particularly economically without significantly increasing the weight of the valve module 3. It is possible to use a shape memory element for each valve. In special cases the valve functions can also be coupled to each other, whereby a shape memory element then actuates more than one valve.

In addition, extra connections 24 are provided on the valve module 3 for additional gas cushions 4, which from case to case are used or remain unused. The use of the aircraft seat massage system should be as flexible as possible and, for this reason, be designed as a modular system. In order to keep the number of components in the modular system as low as possible, the individual modules, especially the valve module 3, are so designed that they can be used for simple seats, e.g., economy class, as well as for higher-grade first-class seats.

To keep the wiring effort for the massage system as low as possible a daisy chain circuitry is planned.

With regard to a better ease of service, it is planned to equip the system master with integrated test equipment for the execution of self-tests BITE (Built-In-Test-Equipment). This also contains an electronic error memory in which system parameters, especially system errors or defect codes are stored during the flight. During a check, the data can easily be read via an interface.

Because the massage system is fully integrable, the error memory can also be located in an existing superordinate aircraft-data-module, e.g., in an in-flight entertainment module or in a passenger control unit (PCU) 26. The flight crew can also be made aware of severe defects during the flight.

For a comfortable aircraft seat massage system, a large number of gas cushions 4 are provided. These are distributed across various parts of the seat. One part of the gas cushions is positioned in the backrest 13, one part in a part of the seat and one part in a leg support.

A part of the seat 4 can also be used as a lumbar support 16. In this case the gas cushions are usually larger than the normal gas cushions 4 which are mainly used for the massage function. Thereby the lumbar supports 16 cover a larger portion of the backrest than the normal gas cushions 4, which can also be arranged in several rows in order to enable a better adaptability to the passenger's body.

A large number of possibilities is conceivable for attaching gas cushions 4 to the seat. Therein it is essential that fitting the gas cushions is as uncomplicated as possible and can also be corrected. In accordance with the invention, the gas cushions can thus be attached to a seating element by means of a flange connection or a Velcro fastener or by means of a zip. Since the normal gas cushions are made of inflammable material they are, as a rule, in a flame retarding cover. This can easily be fitted with one of the assembly aids mentioned.

More highly developed aircraft seat systems have evaluation modules for passenger data. The aircraft seat massage system according to the invention can be operated independently and can, by using an evaluation module 12 for passenger data, be preset individually to the passenger's requirements or load/activate programs individually tailor-made to the requirements of the respective passenger. Hereby approved patient data can also be used for this. The passenger data 28 can be read in by a chip card, from a mobile device, by a secure Internet connection or from data stored by the airline. A manual input of data is always possible.

The passenger data 28 can, for example, be used to adapt the filling level of a majority of the gas cushions 4 to the passenger's height and weight. Thus, there is no longer any need for a passenger, after boarding the aircraft, to initially have to deal with an incorrectly adjusted seat.

Figure 2A:
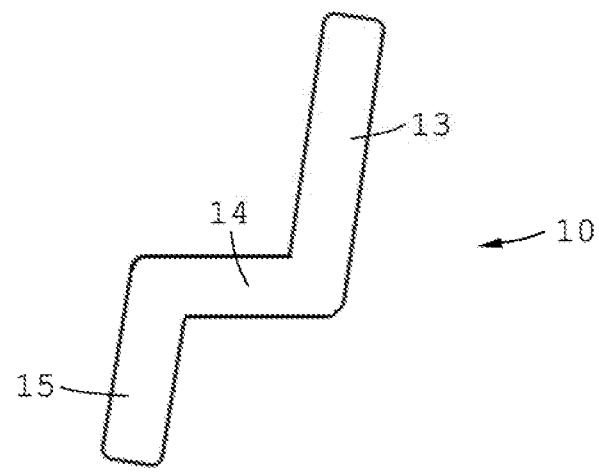
FIG. 2a is an aircraft seat in a TTL position.

FIG. 2a shows a stylized aircraft seat 10 in a TTL position (Taxi-Takeoff-Landing), with a backrest 13, a seat part 14 and a leg support 15. This position is used as instructed in particular during takeoff and landing or in any other dangerous situation. In this sitting position the safety aspects have priority, for this reason the gas cushions should enable a stable sitting position. This can, for example, be achieved by increasing the pressure in the side gas cushions.

Figure 2B:
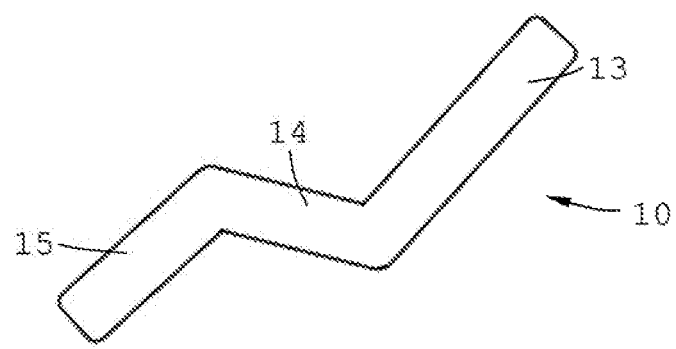
FIG. 2b is the aircraft seat in a relax position.

FIG. 2b shows the aircraft seat 10 in a relax position. Here the backrest 13 as well as the leg support 15 are tilted in comparison to the TTL position (Taxi-Takeoff-Landing). The seat part 14 is also tilted back to increase the comfort. The tilt angle can be freely selected by the passenger without any limitations to the massage function.

Figure 2C:
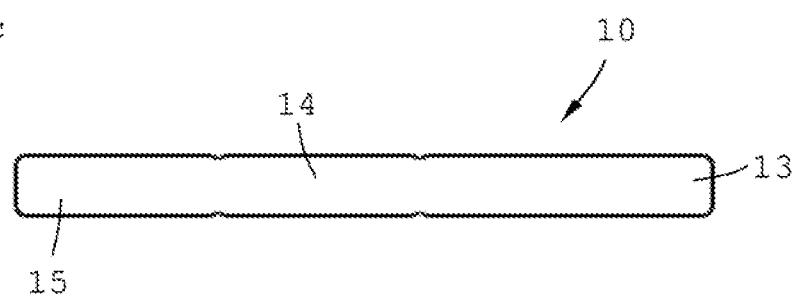
FIG. 2c is the aircraft seat in a reclining position.

FIG. 2c shows the aircraft seat 10 in a reclining position (full flat). Here the backrest 13, the seat part 14 and the leg support are set in a straight line. This position serves as a sleeping position, for this reason the gas cushions can be set harder or softer depending on the passenger's requirements.

Expediently the filling level of the gas cushions 4 should be controllable depending on the seat position, because, as a rule, not all the individual functions are suitable in all seat positions. In the TTL position (Taxi-Takeoff-Landing) FIG. 2a, a safe seat position is much more important than a relaxed seat position. Therein the filling level of the gas cushion should, as far as possible, be optimized for the passenger's stable support. Fundamentally a massage function can also be integrated in this position.

In a relax position FIG. 2b, other characteristics of the seat are, on the contrary, more important. For this reason, the seat has, in this position, a massage seat functionality, in which the quantity of gas in the gas cushions 4 can alternately be increased and reduced. At the same time there is the possibility of setting the dynamics of the massage function as desired. Fundamentally, however, a massage function can also be implemented in the other seat positions.

An active seat function with which an imperceptible change of position of the seated passenger can be realized by a gradual filling and releasing of the gaseous medium from one or a number gas cushions 4 is also of great benefit. As a result, the spine and/or the surrounding muscles of the passenger are moved and a regeneration phase for the vertebral discs is made possible. This prevents or eases back trouble caused by too long static sitting.

In a third seat position, the reclined position (full flat) FIG. 2c, the seat is optimized for comfortable sleeping, especially for the individual requirements of the respective passenger. Because different passengers have different habits and requirements predefined programs or static settings can, in this case, be selected. The data regarding this can, as already mentioned, also be transmitted in advance.

Different massage programs are available for the three seat positions mentioned, or the programs adapt to the respective seat position.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 Aircraft seat massage system
2 Pump module
3 Valve module
4 Gas cushion
5 Pump connection line
6 Control line
7 Gas cushion connection line
8 Seat actuation system
9 Bus connection
10 Aircraft seat
11 User interface
12 Evaluation module
13 Backrest
14 Part of the seat
15 Leg support
16 Lumbar support
17 Pump control input
18 Air pipe connection
19 Air outlet
20 Outlet connection
21 Data interface
22 Bus connection
23 Pressure sensor
24 Additional connections
25 Switching unit
26 PCU
27 Temperature sensor
28 Passenger data
29 Heating function
30 Piezo sensors
31 Heating elements

What is claimed is:

1. An aircraft seat massage system comprising:
a plurality of fillable gas cushions;
a pump module for conveying a gaseous medium, the pump module including a BLDC motor;
a valve module to convey and/or release the gaseous medium to and from the plurality of fillable gas cushions;
a pump connection line arranged between the pump module and the valve module to guide the gaseous medium;
a control line positioned to control the valve module as a slave by the pump module as a system master and wherein the control line is formed by at least one of the group consisting of a power supply line, a rotational speed control line and a bus connection;
a number of gas cushion connecting lines between the valve module and a respective gas cushion of the plurality of fillable gas cushions; the gas cushions are divided in several groups and at least partially arranged in several rows, on a backrest, part of the seat and a leg support, wherein each gas cushion of the plurality of fillable gas cushions can controlled individually;
a seat actuation system and the massage system operated independently of the seat actuation system, and
the massage system is configured to be operated completely independently of other systems combined as a subsystem with the other systems,
wherein the valve module is a manifold connected to the plurality of fillable gas cushions.

2. The aircraft seat massage system according to claim 1, wherein at least two gas cushions are available.

3. The aircraft seat massage system according to claim 1, wherein a switching unit and/or a PCU (Passenger Control Unit) is connected directly to the system-master without a bus connection.

4. The aircraft seat massage system according to claim 1, wherein a seat actuation system is connected to the system-master via a bus connection.

5. The aircraft seat massage system according to claim 1, wherein one or more pressure sensors is/are connected to the valve module and/or to the seat actuation system, whereby the pressure sensors serve to measure the cushion pressure of the plurality of fillable gas cushions and/or the seat occupation recognition and/or to record passenger data.

6. The aircraft seat massage system according to claim 1, wherein one or more gas cushions of the plurality of fillable gas cushions are equipped with a heating function, wherein the separate gas cushions of the plurality of fillable gas cushions can be controlled individually.

7. The aircraft seat massage system according to claim 6, wherein the heating function of the plurality of fillable gas cushions is controlled depending on a massage program and/or depending on the ambient temperature in the cabin and/or as a seat heating function.

8. The aircraft seat massage system according to claim 7, wherein the plurality of fillable gas cushions' heating system is controlled via the seat actuation system or via the system-master.

9. The aircraft seat massage system according to claim 1, wherein a user interface is connected electrically or through a wireless link to the system master or the seat actuation system.

10. The aircraft seat massage system according to claim 1, wherein the valve module contains shape memory elements, with which at least one valve is individually activated or a valve function is controlled or regulated.

11. The aircraft seat massage system according to claim 1, wherein the system master has integrated test equipment for performing self-tests.

12. The aircraft seat massage system according to claim 1, wherein the system master contains an electronic error memory that is read out.

13. The aircraft seat massage system according to claim 1, wherein the seat massage system is connected to a superordinate aircraft-data-module, wherein the aircraft data-module is fitted with an error memory that can be read out.

14. The aircraft seat massage system according to claim 1, wherein one or more gas cushions of the plurality of fillable gas cushions is/are connected to a seat element by means of a flange or Velcro fastener or by means of a zip.

15. The aircraft seat massage system according to claim 1, wherein a majority of gas cushions of the plurality of fillable gas cushions is set individually in advance by reading out and evaluating passenger data with the aid of an evaluation module.

16. The aircraft seat massage system according to claim 1, wherein the filling level of a majority of gas cushions of the plurality of fillable gas cushions is adjusted to the passenger's size and weight.

17. The aircraft seat massage system according to claim 1, wherein the filling level of the gas cushions of the plurality of fillable gas cushions is controlled depending on the seating position.

18. The aircraft seat massage system according to claim 1, wherein the seat geometry and the hardness of the seat is optimized in a TTL (Taxi-Takeoff-Landing) position, which must, in particular, be set during takeoff and landing for comfortable but stable sitting.

19. The aircraft seat massage system according to claim 1, wherein the seat has massage seat functionality in a relax position, in which the quantity of gas in the plurality of fillable gas cushions is alternately increased and reduced.

20. The aircraft seat massage system according to claim 1, wherein an active seat function causes a change of position of a seated passenger by a gradual filling and releasing of the gaseous medium from one or a number of gas cushions of the plurality of fillable gas cushions.

21. The aircraft seat massage system according to claim 1, wherein the valve module has additional connections for further gas cushions beyond the plurality of fillable gas cushions.

22. The aircraft seat massage system according to claim 1, wherein the system master is integrated in, or can be integrated in, a daisy chain circuitry.

23. The aircraft seat massage system according to claim 1, wherein the system master has integrated test equipment for performing self-tests (Built-In-Test-Equipment—BITE).

24. The aircraft seat massage system according to claim 1, wherein at least one gas cushion of the plurality of fillable gas cushions serves as a lumbar support.

25. Aircraft seat with a massage system according to claim 1.

26. The aircraft seat massage system according to claim 1, wherein the valve module is directly connected to the control line, the pump connection line, and the gas cushion connecting lines.

\* \* \* \* \*